United States Patent [19]

Press et al.

[11] Patent Number: 4,537,425

[45] Date of Patent: Aug. 27, 1985

[54] HIGH INTEGRITY FLANGE CONNECTION ARRANGEMENT

[75] Inventors: Irving D. Press, West Orange; Harvey R. Nickerson, Roseland; Helm A. Rink, North Haledon, all of N.J.

[73] Assignee: UMC Industries, Inc., Stamford, Conn.

[21] Appl. No.: 377,187

[22] Filed: May 11, 1982

[51] Int. Cl.³ .............................................. F16L 9/14
[52] U.S. Cl. .................................... 285/55; 285/340; 285/363; 285/368
[58] Field of Search .................. 285/55, 340, 368, 363

[56] References Cited

U.S. PATENT DOCUMENTS

| | | | |
|---|---|---|---|
| 1,834,581 | 12/1931 | Ferrell et al. | 285/368 X |
| 2,985,466 | 5/1961 | Solomon et al. | 285/368 X |
| 2,998,984 | 9/1961 | Gressel | 285/340 X |
| 3,278,202 | 10/1966 | Smith | 285/368 X |
| 3,650,550 | 3/1972 | West | 285/55 |
| 3,834,744 | 9/1974 | Masatchi | 285/55 X |
| 4,127,287 | 11/1978 | Davies | 285/55 |
| 4,155,571 | 5/1979 | Gastineau et al. | 285/363 X |
| 4,288,105 | 9/1981 | Press | 285/55 |

FOREIGN PATENT DOCUMENTS

| | | | |
|---|---|---|---|
| 277980 | 11/1964 | Netherlands | 285/368 |
| 572932 | 10/1945 | United Kingdom | 285/356 |
| 1034687 | 6/1966 | United Kingdom | 285/340 |

*Primary Examiner*—Thomas F. Callaghan
*Attorney, Agent, or Firm*—Hopgood, Calimafde, Kalil, Blaustein & Judlowe

[57] ABSTRACT

Connection between flange faces is effected with a rigid metal load bearing ring interposed therebetween for assuming the bolt torquing load and, when desired, for providing a fluid seal. Within said load bearing ring are disposed at least one coned ring spring and a force distributing ring for developing a predetermined sealing force against a flare of non-metallic material, usually a plastic. The flare may be at the end of a pipe or fitting liner or associated with an auxiliary or adapter seal. The spring provides automatic compensation for any cold or hot flow of the material within the flare so as to maintain a fluid seal between said flare and a mating surface.

26 Claims, 16 Drawing Figures

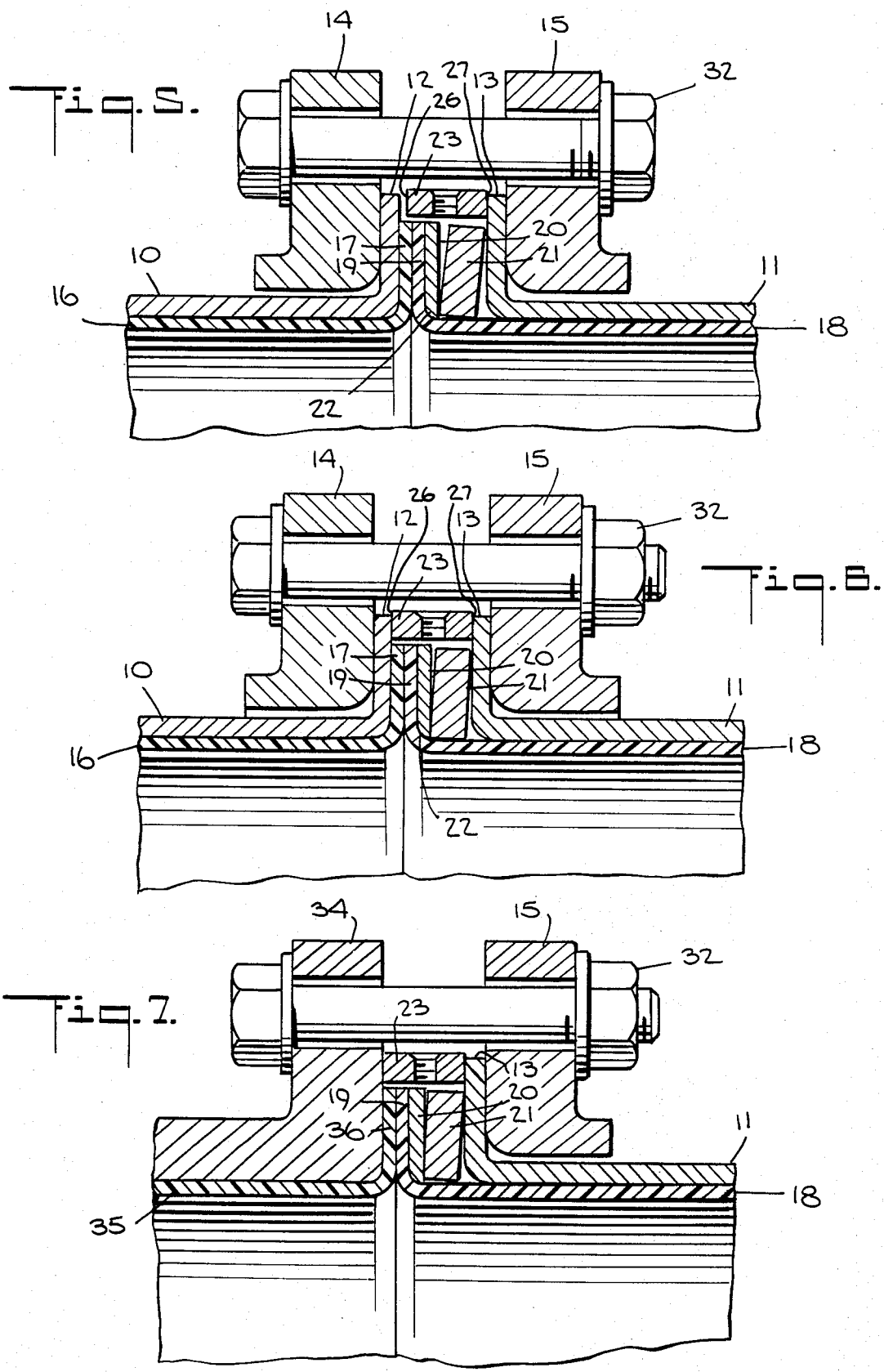

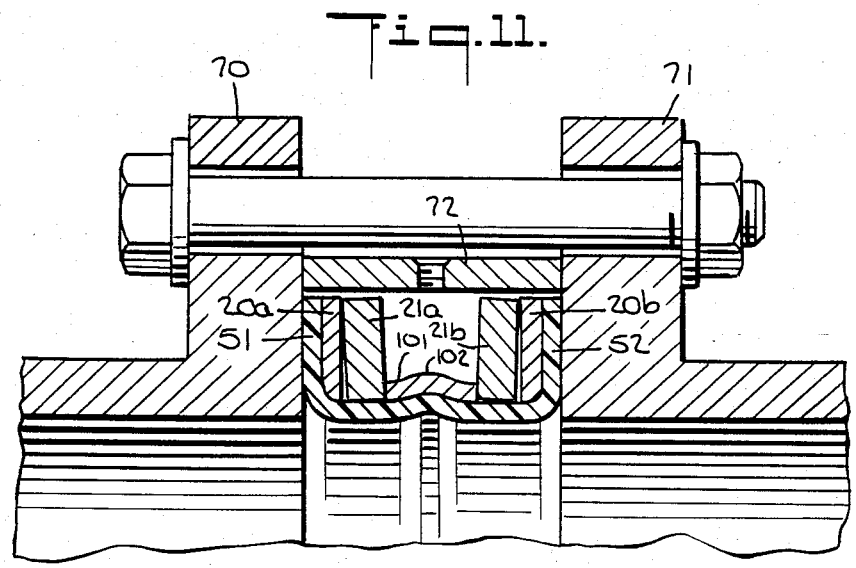
Fig. 11.
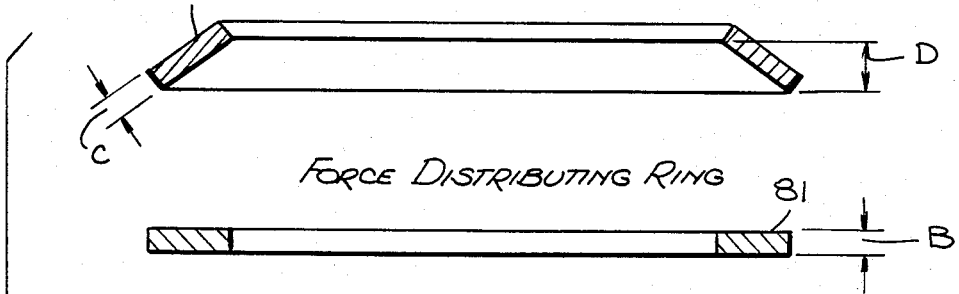
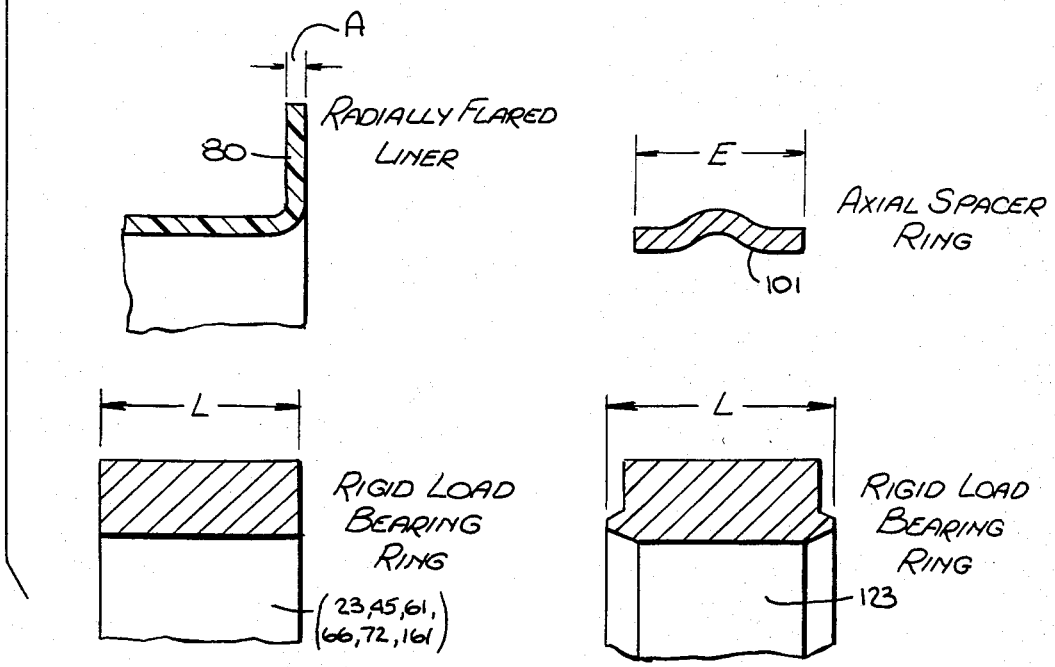
Fig. 16.

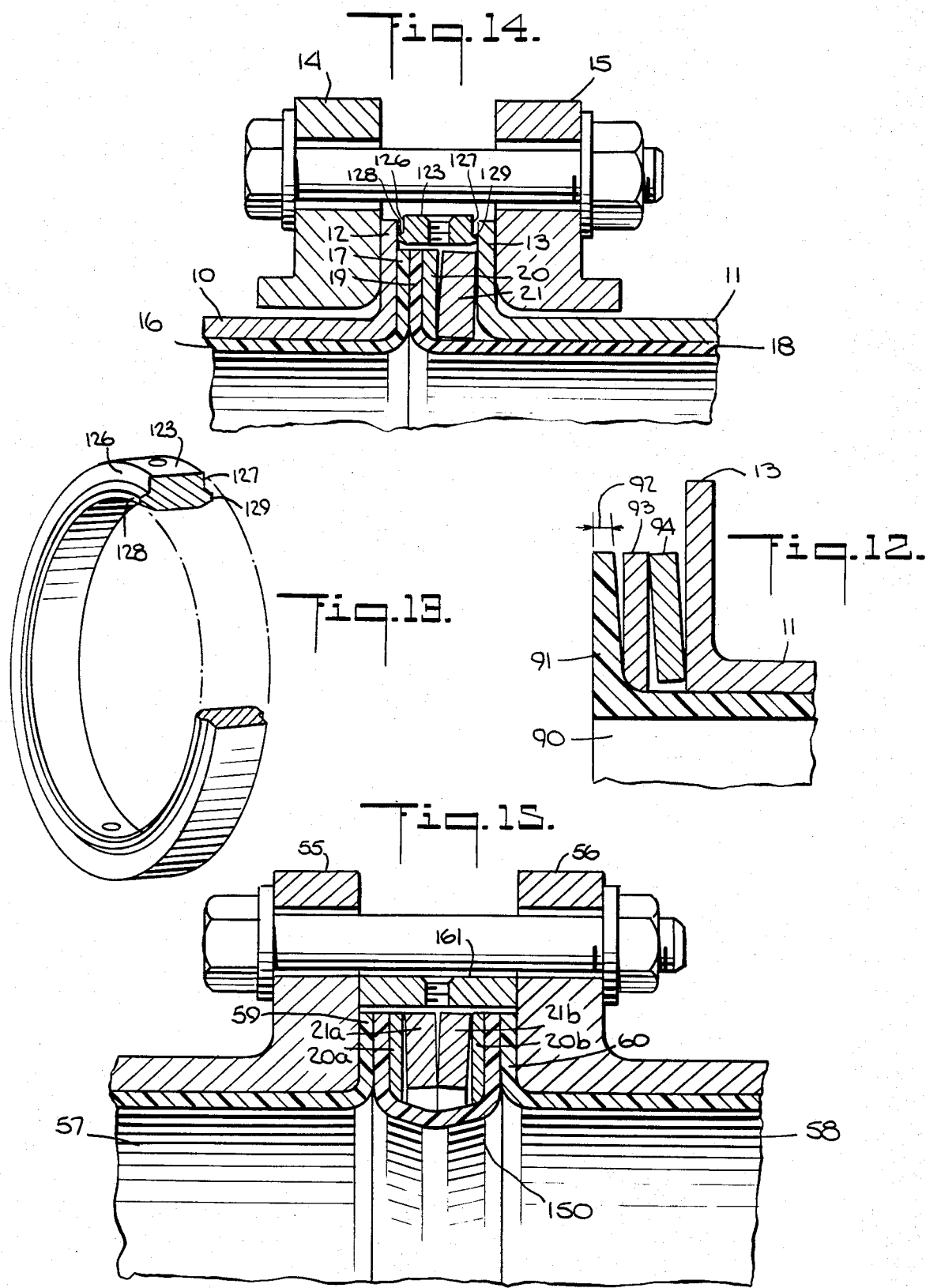

HIGH INTEGRITY FLANGE CONNECTION ARRANGEMENT

BACKGROUND OF THE INVENTION

The present invention relates to fluid piping systems and more particularly to piping systems of the type wherein a metallic housing is lined with a non-metallic material selected from the group consisting of elastomers and plastomers.

Piping systems are in use wherein metal pipe sections or spools are lined with a layer of corrosion resistant plastic. Generally, connections are made between sections of such pipe by flange joints, in which case the lining is brought out of the pipe and flared over the face of the flange both to protect the metal from the fluids being carried and to serve as a gasket. While we shall speak herein of a flange face it should be understood that we intend to include any surface to which a mating flange can be bolted or otherwise secured. An example is a vessel with a flange connector that might not literally fall within the definition of a flange.

Unfortunately, the flared liners cause the mechanical integrity of the flange connections, and consequently the integrity of the entire system, to be degraded. Because the materials used for liners have low strength within their service temperature range, bolting loads must be low. Such bolt loads are significantly less than encountered in conventional unlined piping systems; therefore, worker skill, worker attitude, and pipe misalignment become critical factors. Cold-flow as well as hot-flow of these non-metallic materials cause loss of bolt torque from the already low installation torque. Therefore, such known pipe connections suffer from various types of failure in use.

Beyond normal service conditions, aggravating factors are occasionally encountered that further degrade the integrity of the connection. For example, abnormal operating conditions such as: over-temperature, over-pressure, vibration and water hammer; and abnormal environmental conditions such as: wind, flood, ground settling, earthquake and vehicle impact; either alone or in combination, cause additional deterioration of the original gasket compression and bolting pre-load.

Finally, the fire resistance of the lined system, which should be high because of the metal housings, is compromised by the total vulnerability of the flared ends of the liner.

SUMMARY OF THE INVENTION

With the above mentioned deficiencies in mind, it is an object of the present invention to provide a high integrity piping connection that minimizes or overcomes such deficiencies. More specifically, the invention has for an object to provide a flange connection that can be assembled with essentially permanent, high bolt pre-loading and which includes means providing automatic compensation for the effects of creep and both cold and hot flow of the liner material.

In accordance with the invention there is provided an arrangement for establishing a fluid-tight seal between the faces of a flange connection in a piping system, said arrangement comprising a rigid metal load bearing ring sized to fit between said flange faces with an inside diameter larger than the diameter of the fluid passage through said piping system at said connection and a predetermined axial length for engaging said flange faces and establishing a cavity bounded by said flange faces, said inside diameter and said diameter of said fluid passage; and at least one coned ring spring, one force distributing ring, and one radial flare of non-metallic material disposed within said load bearing ring for disposition within said cavity, said flare being engagable by said force distributing ring; the relationship between said coned ring spring, said force distributing ring and said flare being such that within said cavity when said load bearing ring is engaged by said flange faces said coned ring spring is under partial compression exerting force through said force distributing ring against said flare to urge said flare into fluid sealing engagement with a mating surface.

BRIEF DESCRIPTION OF THE DRAWINGS

The invention will be better understood after reading the following detailed description of the presently preferred embodiments thereof with reference to the appended drawings in which:

FIG. 5 is a fragmentary longitudinal sectional view of the embodiment of FIG. 1 showing the parts brought together prior to the tightening of the bolts;

FIG. 6 is a view similar to that of FIG. 5, but showing the components after full rated torque has been applied to the bolts thereof;

FIG. 7 is a view similar to that of FIG. 6, but showing another embodiment of the invention wherein one of the pipes is provided with a Van Stone flange while the other pipe has a fixed flange;

FIG. 8 is a view similar to that of FIG. 6, but showing another embodiment of the invention wherein a lined pipe with a Van Stone flange end is connected to a flange connector face on a vessel or the like;

FIG. 11 is a view similar to that of FIG. 10, but showing both piping components that are being joined as being unlined;

FIG. 12 is an enlarged fragmentary section illustrating an alternative embodiment of the invention;

FIG. 13 is a view similar to FIG. 2 showing a modification of the load bearing ring to provide for auxiliary fluid sealing;

FIG. 14 is a view similar to FIG. 6 showing the ring of FIG. 13 in a completed assembly;

FIG. 15 is a cross-sectional view of an assembly incorporating a modification of the adapter of FIG. 9; and FIG. 16 is a collective view of various components constituting a part of the present invention and showing certain significant dimensions thereof.

The same reference numerals are used throughout the drawings to designate the same or similar parts.

DETAILED DESCRIPTION OF THE PREFERRED EMBODIMENTS

Figure 1:
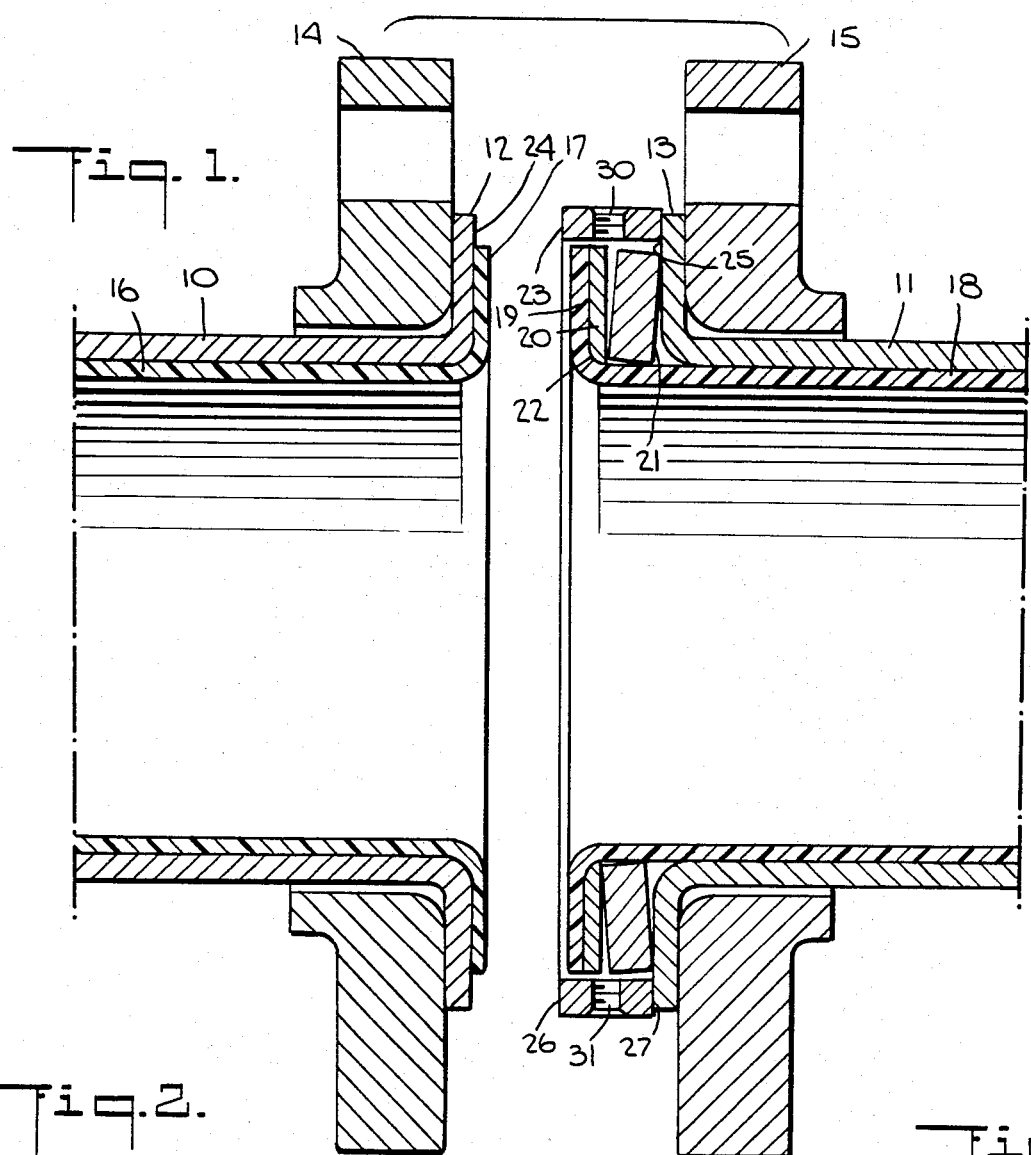
FIG. 1 is a longitudinal sectional view through a lined pipe connection with the pipe ends separated and with the flanges of the Van Stone type.
Figure 2:
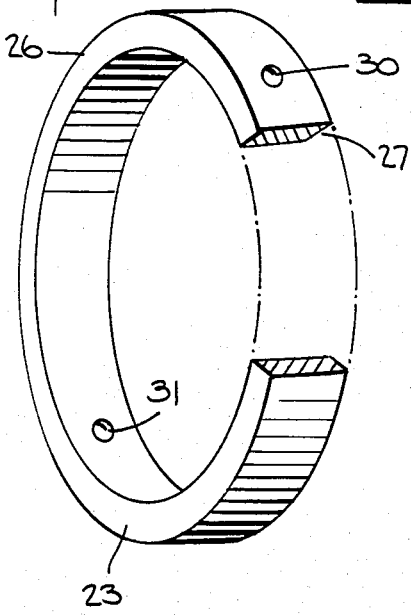
FIG. 2 is a perspective view of the rigid metal load bearing ring used in the embodiment of FIG. 1.
Figure 4:
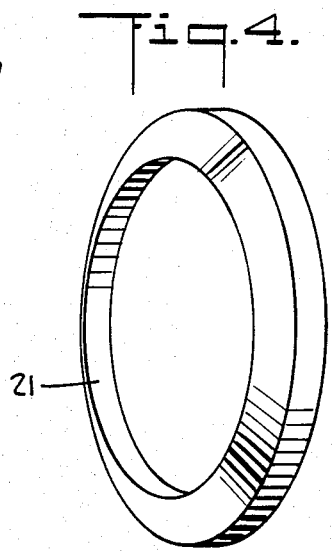
FIG. 4 is a perspective view of the coned ring spring used in the embodiment of FIG. 1.

Referring now to FIGS. 1 to 4 there is illustrated therein the essential components of a typical embodiment of the subject invention. Two pipe sections or spools 10 and 11, only one end of each being shown in the drawings, terminate in pipe laps 12 and 13, respectively. On the end of each pipe section is mounted a Van Stone flange 14 and 15, respectively. The pipe section 10 is provided with a liner 16 having an end terminating in a radially flared section or flare 17 overlying the face of the pipe lap 12 but with the margin of the flare 17 terminating radially inwardly of the margin of the lap 12, the latter being extended beyond the point heretofore conventionally employed to a point just short of the radially inner boundary of the bolt circle on the flange 14. By way of example, the liner 16 may be of polytetrafluoroethylene (P.T.F.E.), the pipe section 10 of steel, and the flange 14 of ductile iron.

Figure 3:
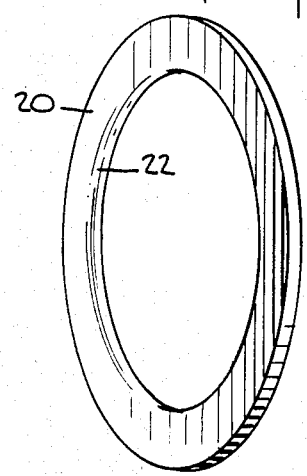
FIG. 3 is a perspective view of the force distributing ring used in the embodiment of FIG. 1.

In similar fashion the pipe section 11 is provided with a liner 18 terminating in a radially flared section or flare 19, but with the liner 18 projecting from the pipe 11 such that the flare 19 is axially spaced from the pipe lap 13. In such space between lap 13 and flare 19 there is disposed a force distributing ring 20 and a coned ring spring 21 mounted on the projecting lining layer 18. As best seen in FIG. 3, the radially inner edge 22 of the ring 20 is rounded, and when ring 20 is assembled behind the flare 19 the rounded edge 22 contacts the liner 18 providing a non-crack-inducing transition between the main body of the liner 18 and the flared section 19.

The coned ring spring 21 and the force distributing ring 20 have substantially the same ID and OD with the OD, preferably, being approximately equal to the diameter of the outer margin of flare 19. Preferably, the outer margins of flares 17 and 19 are substantially equal in diameter, and, for reasons that will become apparent, the wall thicknesses of the two flares 17 and 19 should be controlled so as to be substantially equal and uniform at least circumferentially.

The final component of the connection, except for the usual bolts, not shown, is the rigid metal load bearing ring 23 sized to fit between the faces 24 and 25 of the flange connection, here located on the pipe laps 12 and 13, respectively. The inside diameter of the ring 23 is larger than the fluid passage through the pipes 10 and 11 so as to encircle the rings 20 and 21 with slight clearance. A pair of tapped radial bores 30 and 31, each terminating, if desired, in a countersunk seat at the radially outer end thereof, are located on opposite sides of the ring 23.

FIG. 5 shows the pipe ends of FIG. 1 brought together with the flared sections 17 and 19 in engagement but with the coned ring spring 21 still relaxed and zero torque applied to the bolts, one of which appears at 32. In the embodiments now being described the coned ring spring 21 is installed with the convex side facing the force distributing ring 20. Hence, force exerted by spring 21 against ring 20 is applied near the radially inner margin of ring 20 in the vicinity of the bend in the liner 18. Consequently, if ring 20 is insufficiently stiff to resist cupping, maximum sealing pressure will be applied closer to the radially inner than to the radially outer boundary of the flared section of the liner. Therefore, it is important that ring 20 be sufficiently rigid that it distributes the force from spring 21 over a broad surface area of the plastic flares and that it does not allow for concentration of the force which might cut through the non-metallic material. However, depending on the particular non-metallic materials selected for the liner it may be desirable to design the stiffness of the ring 20, or alter its usual rectangular cross section, to predetermine a desired zone of force concentration and/or to establish a desired force pattern. Also for reasons that will be discussed later in this description, circumstances may exist warranting reversal of the coned ring spring.

The axial length of the load bearing ring 23 should be chosen such that the opposite radial surfaces 26 and 27 engage the respective faces 24 and 25 of laps 12 and 13 before the coned ring spring 21 has been flattened completely. That is, the final assembly relationship should be substantially as shown in FIG. 6. The engagement of surfaces or sidewalls 26 and 27 with laps 12 and 13 may, depending upon the smoothness of the mating surfaces, be sufficient to establish a substantially fluid-tight seal therebetween. In any event the torque should be sufficient to establish high structural preloading on the bolts. So long as one is not concerned with establishing such fluid-tight seal, the torque required on the flange bolts is not critical and can readily be "felt" and judged by the average pipe assembler. Over torquing is no longer a problem since the structural forces are acting entirely through metal. Yet, the pressure applied to the non-metallic liner flares is controlled by virtue of the fact that the pressure is entirely a function of the spring characteristic and of the restoring force developed by spring 21. If the thicknesses of the flares 17 and 19 are carefully controlled, along with the dimensions of the metallic parts, the compression of spring 21 and, hence, its restoring force, when the ring 23 is engaged by laps 12 and 13, can be predetermined within fairly close limits. Therefore, the sealing pressure established between flares 17 and 19 can be optimized independent of the actual torque loading of the flange bolts. Further, the pressure on flares 17 and 19 is maintained within the fluid sealing range by the restoring force of spring 21, when cold or hot flow of the plastic occurs.

When the pipe is pressure tested any leakage past the flares 17 and 19 will be detectable via bores 30 and 31. Also bores 30 and 31 provide for convenient testing when it is desired to test sealing capability of ring 23 by introducing fluid under pressure. A collateral advantage afforded by bores 30 and 31 is that they permit flushing the space within ring 23 if any leakage should occur past flares 17 and 19, for instance, due to improper assembly, and they also permit installation of vent connections, if desired, to eliminate hazardous gas build-up. Solid plugs can also be installed, if desired.

It should be obvious that the invention is not limited to use with Van Stone flanges as shown in FIG. 1 but can be applied to various other flange connection assemblies. For example, refer to FIG. 7 wherein flange 34 is shown formed integral with its associated structure, and the liner 35 passes therethrough terminating in a radial flare 36. In all other respects the assembly can be the same as that shown in FIG. 6.

Figure 8:
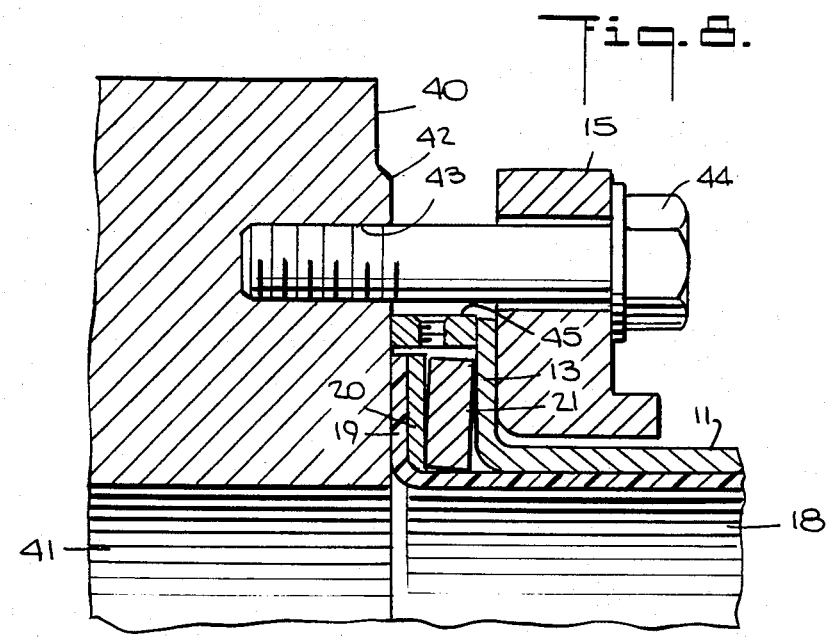

In the embodiments described so far, two lining flares are contained within the cavity bounded by the faces of the flanges and the ID of the load bearing ring. However, as shown in FIG. 8. a lined component can be connected to an unlined component. The unlined component may be a vessel 40 having a port 41 surrounded by a raised flange connection surface 42 provided with tapped bores such as the bore 43 for receiving flange bolts such as the bolt 44. Because of the omission of the second flared section, the axial length of load bearing ring 45 has to be reduced over the length of ring 23 previously described. However, the relative relationship of the parts is essentially the same with ring 45 engaging surface 42 and lap 13 before spring 21 is completely flattened.

Figure 9:
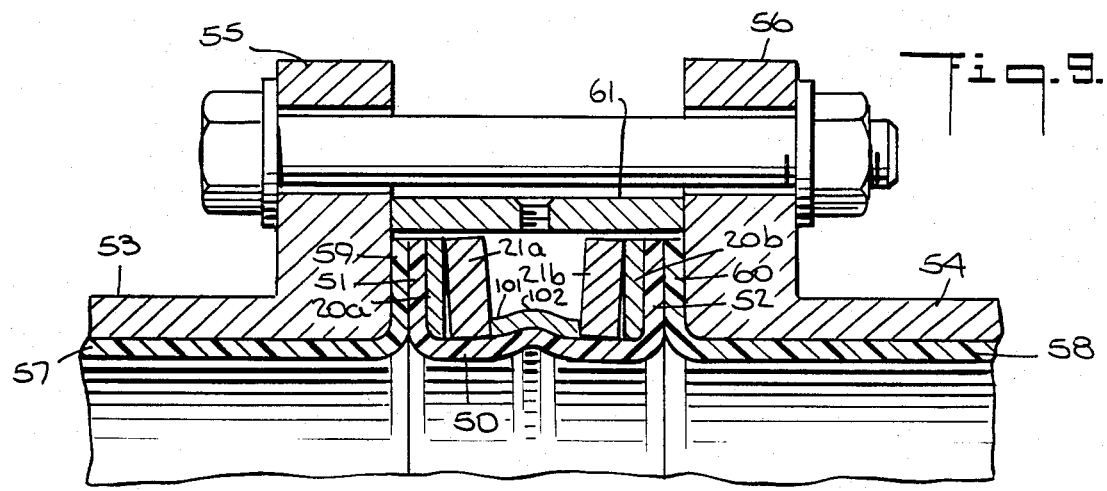
FIG. 9 is a view showing the use of an adapter between two flanged and lined pipe ends.

When the advantages afforded by the present invention are to be omitted with pre-existing lined pipe components it is necessary to rely upon an adapter such as shown in FIG. 9. The adapter is double-acting having two coned ring springs 21a and 21b that are substantially identical, and two force distributing rings 20a and 20b, also identical, but springs 21a and 21b are oppositely directed with their convex sides facing each other and their concave sides engaging the rings 20a and 20b. The rings, 20a and 20b, and springs, 21a and 21b, are mounted on a section 50 of liner material provided with flares 51 and 52. Interposed between springs 21a and 21b is an axial spacer ring 101 having a radially projecting circumferential bulge 102 for accommodating a radially outward bulge or corrugation of the liner section 50 as it is axially contracted during assembly of the flange connection. The pipe sections 53 and 54, terminating in flanges 55 and 56, are provided with conventional liners 57 and 58, terminating in flares 59 and 60. Finally, the assembly includes a metal load bearing ring 61 of augmented axial length to accommodate the four liner flares 51, 52, 59 and 60, as well as the axial spacer ring 101 and the dual sets of force distributing rings and coned ring springs. In other respects the assembly should follow the principles previously enunciated with regard to the previously described embodiments.

Figure 10:
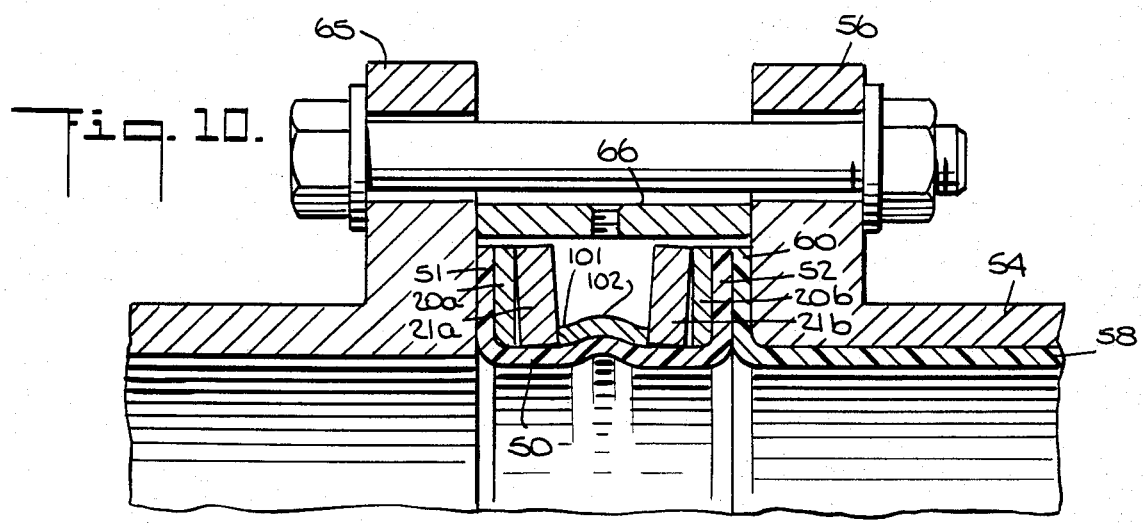
FIG. 10 is a view similar to that of FIG. 9 showing the use of the adapter where a lined pipe section is to be joined to an unlined flange connector.

Another situation contemplated is illustrated in FIG. 10 wherein an unlined flange connection 65 is to be joined to a conventionally lined pipe 54. The elements 20a, 20b, 21a, 21b, 50, 51, 52 and 101 of the adapter can be identical to that described with reference to FIG. 9. However, the metal load bearing ring 66 has its axial length reduced over that of ring 61 to allow for the absence of the fourth liner flare. Otherwise, the construction and operation is the same as in FIG. 9.

If the advantages afforded by the adapter are to be obtained even if neither of the flange components is provided with a liner, resort can be had to the arrangement shown in FIG. 11. The unlined flanges are designated 70 and 71, while the axially shortened metal load bearing ring is designated by the numeral 72. The remaining components of the adapter can be identical to that shown in FIGS. 9 and 10 and bear the same reference numerals.

While the embodiments described above with reference to FIGS. 1–8 disclose the convex side of the coned ring spring in contact with the force distributing ring, the spring can be reversed, as has been done in FIGS. 9–11, and under the circumstances now to be described, such reversal may even be desirable. During fabrication of plastic lined pipe and fittings the flares are produced by radially expanding and cuffing backwardly a projecting length of tubular material. Depending on the specific process used the material in the flare may have a tendency to thin as it is spread circumferentially. Therefore, as shown in FIG. 12, a liner 90 may terminate in a flare 91 that tapers in the radial direction such that the inner and outer surfaces converge at some slight angle 92. Consequently, if the force distributing ring 93 is designed with sufficient compliance to conform to the taper angle 92, the use of the arrangement in FIG. 12 with a properly designed coned ring spring 94 will permit uniform sealing pressure to be distributed over a broad surface area, if desired. That this result does obtain has been borne out by testing at 500° F.

Under certain circumstances it may be desirable to ensure the development of a fluid-tight seal between the load bearing ring and the mating flange faces. For this purpose the opposite radial surfaces 126 and 127 of the ring 123, as shown in FIG. 13, are provided with respective seal forming means consisting of circular ribs 128 and 129 projecting axially therefrom. FIG. 14 shows the ring 123 installed in a flange connection similar to that shown in FIG. 6.

A consideration of the adapter construction shown in FIGS. 9–11 should reveal why the coned ring springs were disposed with concave sides facing the force distributing rings. If, however, radial inward projection of the adapter liner section can be tolerated, the axial spacer ring 101 can be omitted and the springs 21a and 21b reversed. This modification is shown in FIG. 15 wherein the liner section 150 bulges radially inwardly. The load bearing ring 161 must be shorter than ring 61 of FIG. 9 in view of the reduced axial length of the adapter.

It is possible to define the axial lengths of the various load bearing rings in terms of the dimensions of the other components. Thus, referring to FIG. 16, if the thickness of the flare 80 is represented by A, the thickness of the force distributing ring 81 is represented by B, the thickness of the coned ring spring 82 is represented by C, the height of the concavity of the latter is represented by D, and the axial length of the spacer ring 101 is represented by E, the following equations will define to a close approximation the axial length L of the metal load bearing ring for each of the previously described embodiments, where x represents a fraction and the particular load bearing ring embodiment is identified by employing the appropriate reference numeral as a subscript after the L:

| | |
|---|---|
| (FIGS. 1 and 7) | $L_{23} = 2A + B + C + xD$ |
| (FIG. 8) | $L_{45} = A + B + C + xD$ |
| (FIG. 9) | $L_{61} = 2(2A + B + C + xD) + E$ |
| (FIG. 10) | $L_{66} = 3A + (B + C + xD) + E$ |
| (FIG. 11) | $L_{72} = 2(A + B + C + xD) + E$ |
| (FIG. 14) | $L_{123} = 2A + B + C + xD$ |
| (FIG. 15) | $L_{161} = 2(2A + B + C + xD)$ |

Some sense of the dramatic improvement afforded by the present invention can be acquired by considering the results of comparison testing. The tests described below were performed on flange connections between 4" pipes lined with P.T.F.E., and are typical of tests on other sizes. Assemblies representative of the prior art were produced using: (a) plain flanges where the back or external surface of the flare engaged a smooth sealing surface on the flange face; (b) flanges with circular grooves on the sealing faces in contact with the flare; and (c) flanges where the flare was backed up by flat rings containing a plurality of uniformly distributed perforations, i.e., the back-up rings were mounted on the liner between the flange and the flare. For comparison assemblies corresponding to FIGS. 1–6 herein were tested. Each assembly was assembled initially with all flange bolts torqued to 90 ft-lbs. The assemblies were then placed in an oven at 450° F. for about 4 hours, simulating service in the upper temperature range for this particular liner material. The assemblies were then removed from the oven and allowed to cool to room temperature. With all of the prior art assemblies the bolt torque had dropped off substantially, reaching values in the range of 10 to 15 ft-lbs., and the joints all exhibited significant leakage when pressure tested with 420 psi. of air. The assemblies were then re-torqued to 90 ft-lbs. and replaced in the oven for another soak for about 4 hours at 450° C. The plain flange assembly again lost approximately the same amount of torque and leaked as badly as after the first cycle. The groove type again lost the same amount of torque but did not leak. With no re-torquing it was recycled four more times in the oven after which some of the bolts had dropped almost to 0 ft-lbs. and the joint was leaking severely. The type with the perforated back-up rings had only 10 ft-lbs. of torque and severe leakage after the first cycle. It was re-torqued and exposed to two more oven cycles with the results repeating those of the first cycle. Thus, in all cases, the bolt torques in the prior art assemblies fell off severely, producing relatively loose connections structurally, even in those few instances where the plastic still sealed.

By contrast, the assemblies incorporating the present invention experienced no loss of bolt torque or leakage even after being exposed to as many as 15 cycles.

While P.T.F.E. has been mentioned specifically, it should be evident that the invention can be used effectively with other lining materials falling within the broad classification of elastomers and plastomers. In addition, it should be understood that the various flange terminations may be associated with fittings, lined or unlined, and that the invention is not limited to use with pipe spools or sections. In fact, the invention can be applied to any flange connection regardless of the component with which the flange or connector is associated.

Depending upon the desired ratio between the spring force and the elastic deformation of the coned ring spring, which ratio will be dictated by the specific materials employed in and the geometry of the flange connection, each of the coned ring springs described above may advantageously be constituted by a series and/or parallel assembly of such springs.

Having described the invention with reference to the presently preferred embodiments thereof, it is to be understood that various changes in construction and detail can be introduced by those skilled in the subject art without departing from the true spirit of the invention as defined in the appended claims.

What is claimed is:

1. An arrangement for establishing a fluid-tight seal between the faces of an assembled piping system flange connection, said arrangement comprising a rigid metal load bearing ring sized to fit between said flange faces with an inside diameter larger than the diameter of the fluid passage through said piping system at said connection and with a predetermined axial length for engaging said flange faces upon assembly of said flange connection for establishing a cavity of predetermined size bounded by said flange faces, said inside diameter and said diameter of said fluid passage; and an assemblage of components comprising at least one subset consisting of a coned ring spring, a force distributing ring, and a radial flare from a tubular element of non-metallic material, said force distributing ring being located between and adjacent said radial flare and said coned ring spring, said assemblage being disposed within said load bearing ring for location within said cavity upon its establishment, the dimension in the axial direction and the configuration of said components of said assemblage being related to the axial direction dimensions of said load bearing ring such that when said assemblage and said load bearing ring are installed in said cavity in said flange connection along with a predetermined number, including zero, of other radial flares from tubular elements of non-metallic material associated with said flange connection, and with the radial flare of said subset in contact with a respective mating surface, in said subset said coned ring spring will be partially compressed for exerting a predetermined force through said adjacent force distributing ring against said adjacent radial flare to urge said adjacent radial flare into fluid sealing engagement with said mating surface.

2. An arrangement according to claim 1, wherein at least one of said flange faces is at the end of a flanged metal pipe, and of the elements of said one subset said radial flare of non-metallic material is at an end of a layer of said material lining said pipe and projecting therefrom with said one subset coned ring spring and said one subset force distributing ring mounted on said projecting lining layer between said one subset flare and said one flange face.

3. An arrangement according to claim 2, wherein another of said flange faces is at the end of a second flanged metal pipe, said second pipe also being lined with a layer of non-metallic material terminating in a second radial flare overlying a portion of said another flange face, and said mating surface is on said second radial flare.

4. An arrangement according to claim 1, wherein said load bearing ring comprises seal forming circular ribs projecting axially from opposite radial surfaces of said load bearing ring for engaging said flange faces in a fluid-tight seal.

5. An arrangement according to claim 1, wherein the convex side of said one subset coned ring spring faces said one subset force distributing ring.

6. An arrangement according to claim 5, wherein the inside diameter of said coned ring spring is substantially equal to the inside diameter of said force distributing ring such that said spring engages said force distributing ring close to the inside diameter of the latter.

7. An arrangement according to claim 6, wherein said force distributing ring is sufficiently rigid so as to avoid high localized loading in favor of broad surface distributed loading of said radial flare of said one subset under said force exerted by said one subset coned ring spring.

8. An arrangement according to claim 1, wherein said load bearing ring comprises seal forming means on opposite radial surfaces of said load bearing ring for engaging said flange faces in a fluid-tight seal.

9. An arrangement according to claim 2, wherein said load bearing ring comprises seal forming circular ribs projecting axially from opposite radial surfaces of said load bearing ring for engaging said flange faces in a fluid-tight seal.

10. An arrangement according to claim 2, wherein the convex side of said one subset coned ring spring faces said one subset force distributing ring.

11. An arrangement according to claim 10, wherein the inside diameter of said one subset coned ring spring is substantially equal to the inside diameter of said one subset force distributing ring such that said one subset coned ring spring engages said one subset force distributing ring close to the inside diameter of the latter.

12. An arrangement according to claim 11, wherein said one subset force distributing ring is sufficiently rigid so as to avoid high localized loading in favor of broad surface distributed loading of said radial flare of said one subset under said force exerted by said one subset coned ring spring.

13. An arrangement according to claim 1, wherein there is only one of said subsets and none of said other radial flares, and the total axial length, L, of said load bearing ring satisfies the equation, $L=A+B+C+xD$, to a close approximation, where x is a fraction, A, B and C are the thicknesses, respectively, of said radial flare, said force distributing ring, and said coned ring spring, and D is the height of the coned ring spring concavity.

14. An arrangement according to claim 1, wherein in addition to said one subset there is only one of said other radial flares, and the total axial length, L, of said metal load bearing ring satisfies the equation, $L=2A+B+C+xD$, to a close approximation, where x is a fraction, A, B and C are the thicknesses, respectively, of said radial flares, said force distributing ring, and said coned ring spring, and D is the height of the coned ring spring concavity.

15. An arrangement according to claim 1, wherein there are two of said subsets and none of said other radial flares, and the total axial length, L, of said metal load bearing ring satisfies the equation, $L=2(A+B+C+xD)$, to a close approximation, where x is a fraction, A, B and C are the thicknesses, respectively, of said radial flares, said force distributing rings, and said coned ring springs, and D is the height of the coned ring spring concavity.

16. An arrangement according to claim 1, wherein there are two of said subsets and only one of said other radial flares, and the total axial length, L, of said metal load bearing ring satisfies the equation, $L=3A+2(B+C+xD)$, to a close approximation, where x is a fraction, A, B and C are the thicknesses, respectively, of said radial flares, said force distributing rings, and said coned ring springs, and D is the height of the coned ring spring concavity.

17. An arrangement according to claim 1, wherein there are two of said subsets and two of said other radial flares, and the total axial length, L, of said metal load bearing ring satisfies the equation, $L=4A+2(B+C+xD)$, to a close approximation, where x is a fraction, A, B and C are the thicknesses, respectively, of said radial flares, said force distributing rings, and said coned ring springs, and D is the height of the coned ring spring concavity.

18. An arrangement according to claim 1, wherein the concave side of said one subset coned ring spring faces said one subset force distributing ring.

19. An arrangement according to claim 18, wherein the outside diameter of said one subset coned ring spring is almost as large as the outside diameter of said one subset force distributing ring such that said one subset coned ring spring engages said one subset force distributing ring close to the outside diameter of the latter.

20. An arrangement according to claim 19, wherein the rigidity of said one subset force distributing ring is predetermined so as to avoid high localized loading in favor of broad surface distributed loading of said one subset radial flare under said force exerted by said one subset coned ring spring.

21. An arrangement according to claim 20, wherein said predetermined rigidity of the one subset force distributing ring is related to the force exerted thereon by said one subset coned ring spring within said cavity and to the radial taper in said one subset radial flare of nonmetallic material so as to cup an amount substantially equal to said taper for establishing broad surface contact with the latter.

22. An arrangement according to claim 6, wherein said load bearing ring comprises at least one seal forming circular rib projecting axially from each of the opposite radial surfaces of said load bearing ring for engaging said flange faces in a fluid-tight seal.

23. An arrangement according to claim 19, wherein said load bearing ring comprises at least one seal forming circular rib projecting axially from each of the opposite radial surfaces of said load bearing ring for engaging said flange faces in a fluid-tight seal.

24. An arrangement according to claim 27, wherein said assemblage consists of an axial spacer ring in addition to two of said subsets, with said spacer ring being located between said coned ring springs for engagement therewith, there is none other radial flare, and the total axial length, L, of said metal load bearing ring satisfies the equation, $L=2(A+B+C+xD)+E$, to a close approximation where x is a fraction, A, B and C are the thicknesses, respectively, of said subset radial flares, said force distributing rings, and said coned ring springs, D is the height of the coned ring spring concavity, and E is the length of said axial spacer ring.

25. An arrangement according to claim 1, wherein said assemblage consists of an axial spacer ring in addition to two of said subsets with said spacer ring being located between said coned ring springs for engagement therewith, there is one of said other radial flares, and the total axial length, L, of said metal load bearing ring satisfies the equation, $L=3A+2(B+C+xD)+E$, to a close approximation, where x is a fraction, A, B and C are the thicknesses, respectively, of said radial flares, said force distributing rings, and said coned ring springs, D is the height of the coned ring spring concavity, and E is the length of said axial spacer ring.

26. An arrangement according to claim 1, wherein said assemblage consists of an axial spacer ring in addition to two of said subsets with said spacer ring being located between said coned ring springs for engagement therewith, there are two of said other radial flares, and the total axial length, L, of said metal load bearing ring satisfies the equation, $L=4A+2(B+C+xD)+E$, to a close approximation, where x is a fraction, A, B and C are the thicknesses, respectively, of said radial flares, said force distributing rings, and said coned ring spring, D is the height of the coned ring spring concavity, and E is the length of said axial spacer ring.

* * * * *

UNITED STATES PATENT AND TRADEMARK OFFICE
CERTIFICATE OF CORRECTION

PATENT NO. : 4,537,425

DATED : August 27, 1985

INVENTOR(S) : Irving D. Press et al.

It is certified that error appears in the above-identified patent and that said Letters Patent are hereby corrected as shown below:

Column 8, line 1, "dimension" should read --dimensions--.

Claim 24, line 1, "claim 27" should read --claim 1--.

Signed and Sealed this

Nineteenth Day of November 1985

[SEAL]

Attest:

Attesting Officer

DONALD J. QUIGG

Commissioner of Patents and Trademarks